United States Patent
Bedau et al.

(10) Patent No.: US 11,525,386 B2
(45) Date of Patent: Dec. 13, 2022

(54) HYBRID VEHICLE

(71) Applicant: Siemens Mobility GmbH, Munich (DE)

(72) Inventors: Christian Bedau, Berlin (DE); Stefan Hintermeir, Aschau I. Ch (DE)

(73) Assignee: Siemens Mobility GmbH, Munich (DE)

( * ) Notice: Subject to any disclaimer, the term of this patent is extended or adjusted under 35 U.S.C. 154(b) by 0 days.

(21) Appl. No.: 17/628,320

(22) PCT Filed: Apr. 3, 2020

(86) PCT No.: PCT/EP2020/059505
§ 371 (c)(1),
(2) Date: Jan. 19, 2022

(87) PCT Pub. No.: WO2021/013390
PCT Pub. Date: Jan. 28, 2021

(65) Prior Publication Data
US 2022/0268199 A1    Aug. 25, 2022

(30) Foreign Application Priority Data

Jul. 19, 2019  (DE) .................... 10 2019 210 714.1

(51) Int. Cl.
*F01P 7/16*    (2006.01)
*B60K 6/24*    (2007.10)
*F01P 5/10*    (2006.01)

(52) U.S. Cl.
CPC ............. *F01P 7/165* (2013.01); *B60K 6/24* (2013.01); *B60Y 2200/30* (2013.01);
(Continued)

(58) Field of Classification Search
CPC .. F01P 7/165; F01P 2005/105; F01P 2050/24; F01P 2060/18; F01P 2070/04; B60K 6/24; B60Y 2200/30
See application file for complete search history.

(56) References Cited

U.S. PATENT DOCUMENTS 10,814,716 B2    10/2020    Eberspach et al.
2016/0280073 A1*  9/2016    Badger .................. B60W 10/30

FOREIGN PATENT DOCUMENTS

DE    102013209045 A1    11/2014
DE    102017201408 A1    8/2018
(Continued)

*Primary Examiner* — Jacob M Amick
*Assistant Examiner* — Charles J Brauch
(74) *Attorney, Agent, or Firm* — Laurence A. Greenberg; Werner H. Stmer; Ralph E. Locher

(57) ABSTRACT

A hybrid vehicle has an internal combustion engine and an electric drive, each with a cooling circuit with a heat transfer medium and a cooler. A pre-heating circuit is provided between the cooling circuits and it is thermally coupled to the cooling circuit of the electric drive via heat coupling element as a shared component, for a controlled heat exchange between the heat transfer media of the two cooling circuits. The pre-heating circuit has an electrical auxiliary heater, which is connected to the heat coupling element in series, such that the heat transfer medium of the first cooling circuit likewise flows through the electrical auxiliary heater. The electrical auxiliary heater is arranged and designed such that heat generated by the electrical auxiliary heater can be transferred, where necessary, into at least one of the two cooling circuits.

9 Claims, 1 Drawing Sheet

(52) U.S. Cl.
CPC ..... *F01P 2005/105* (2013.01); *F01P 2050/24* (2013.01); *F01P 2060/18* (2013.01); *F01P 2070/04* (2013.01)

(56) References Cited

FOREIGN PATENT DOCUMENTS

| | | | | |
|---|---|---|---|---|
| DE | 102017108832 | A1 * | 10/2018 | ......... B60H 1/00278 |
| DE | 102017108832 | A1 | 10/2018 | |
| DE | 102018205130 | A1 | 10/2019 | |
| DE | 102018207852 | A1 | 11/2019 | |
| EP | 3482053 | A1 | 5/2019 | |
| EP | 3501934 | A1 | 6/2019 | |
| WO | 2018009122 | A1 | 1/2018 | |

* cited by examiner

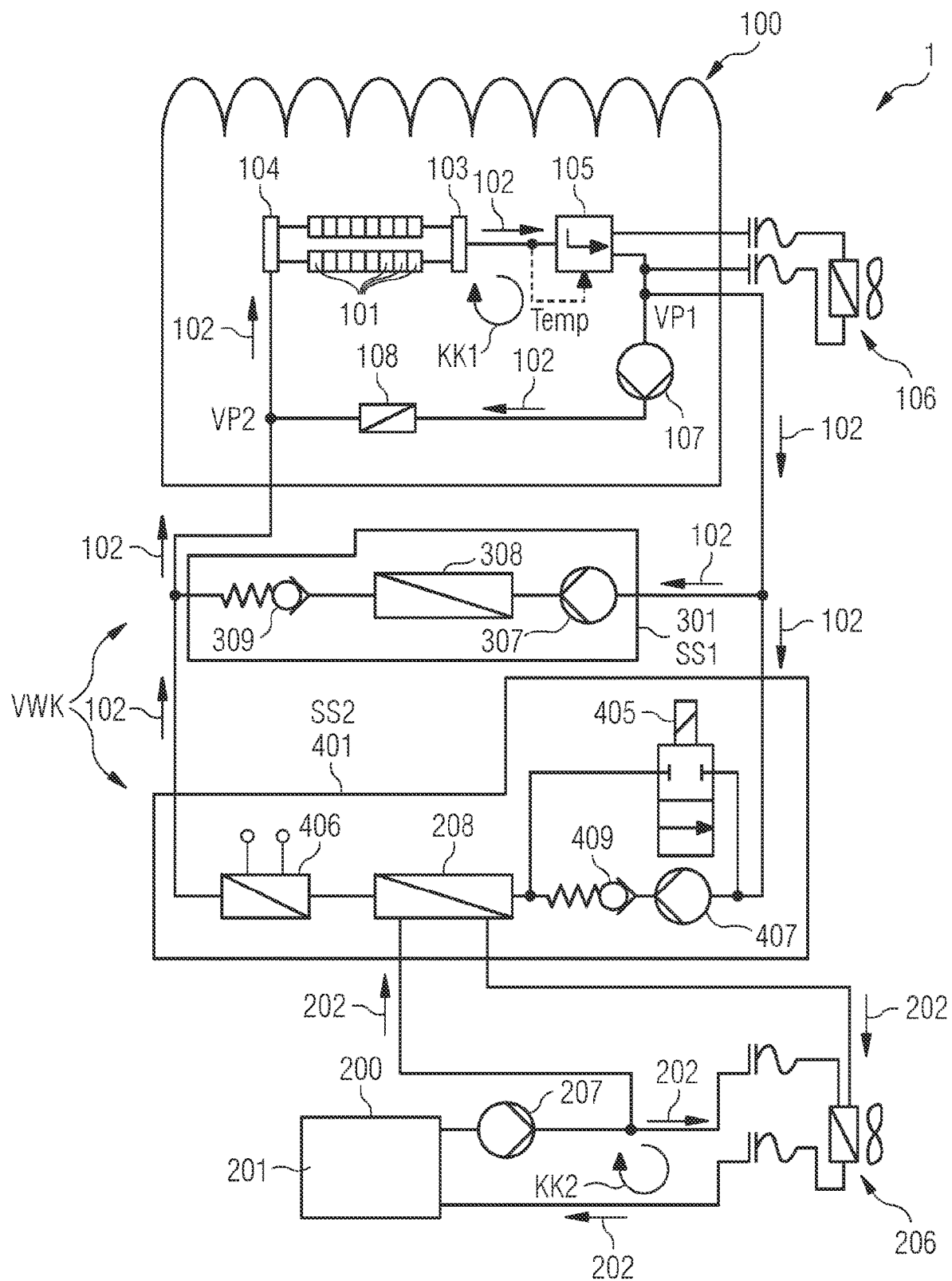

HYBRID VEHICLE

SPECIFICATION

Hybrid Vehicle

FIELD AND BACKGROUND OF THE INVENTION

The present invention relates to a hybrid vehicle, in particular a hybrid rail vehicle, which has an internal combustion engine and an additional electric drive.

A diesel engine comes into consideration in particular as the internal combustion engine, whereas a conventional electric drive of a rail vehicle, with the (main) components required for it and supplied with electrical power by way of a contact wire, is provided in particular as the electric drive.

It is known that, as from a certain overall size, internal combustion engines cannot be started at any temperature, and so at extreme temperatures the internal combustion engine must be preheated for this purpose.

Document DE 10 2018 207 852 A1 describes heating of a diesel engine of a hybrid vehicle. In this case, a thermal transfer from components of the contact-wire-based electric drive to components of the internal combustion engine has been provided in order to achieve sufficient preheating of the internal combustion engine.

If the hybrid vehicle uses the internal combustion engine to operate, the internal combustion engine and its assigned components or units (for example cooling provided for the diesel engine) are engaged in energy conversion, that is to say are operated correspondingly and partly heated. Those components of the hybrid vehicle that are intended for the contact-wire-based electric drive are not then involved in the energy conversion and remain cold.

At extreme temperatures or in corresponding snowy situations in winter, this could lead to icing or accumulations of snow on highly relevant components of the electric drive. In particular, a cooling system of the main transformer would be adversely affected by this if it were integrated in the underfloor area of the hybrid vehicle.

A changeover from the (diesel-based) internal combustion engine drive to the contact-wire-based electric drive could be put at risk if ice forms on the surface of fans of the cooling system provided for the main transformer, and they consequently cannot take in sufficient air for the required cooling. As a consequence, the cooling water used for cooling would heat up in such a way that the contact-wire-based drive would be put at risk.

SUMMARY OF THE INVENTION

DE 10 2017 108 832 A1 discloses a vehicle temperature control system for a hybrid vehicle.

The object of the present invention is to provide an improved hybrid vehicle with respect to the changing of the drive at extreme temperatures, with greater availability and operational reliability of the system components.

This object is achieved by the features as claimed.

Advantageous developments are specified by the dependent claims.

The present invention relates to a hybrid vehicle which has as a changeable drive an internal combustion engine and an electric drive. The internal combustion engine has a cooling circuit which has a heat transfer medium and a cooler and is referred to hereinafter as the first cooling circuit. The first cooling circuit is intended to take up heat from the internal combustion engine by means of the heat transfer medium and conduct it to the cooler in order to make it possible for the heat to be dissipated to the surrounding area of the internal combustion engine or the hybrid vehicle.

The electric drive has a cooling circuit which has a heat transfer medium and a cooler and is referred to as the second cooling circuit. The second cooling circuit is intended to conduct heat from components of the electric drive by means of the heat transfer medium to the cooler in order to make it possible for the heat to be dissipated to a surrounding area of the electric drive or the hybrid vehicle.

Arranged between the first cooling circuit and the second cooling circuit is a preheating circuit, which is connected to the first cooling circuit by way of two connecting points in such a way that the heat transfer medium of the first cooling circuit at least partially circulates through components of the preheating circuit.

The preheating circuit and the second cooling circuit have a heat coupler as a common component. The preheating circuit and the second cooling circuit are thermally coupled to one another by the common heat coupler in such a way that heat can be controllably exchanged between the heat transfer media of the two cooling circuits.

The preheating circuit has an electrical auxiliary heater, which is connected in series with the heat coupler, and so the electrical auxiliary heater is likewise flowed through by the heat transfer medium of the first cooling circuit. The electrical auxiliary heater is in this case arranged and designed in such a way that heat generated by it can be transferred as and when required into at least one of the two cooling circuits.

In an advantageous refinement, the first cooling circuit has cylinders of the internal combustion engine, the heat transfer medium, a collection tank, a distribution tank, an adjustable thermostatic valve, the cooler, a pump and an engine-oil cooler. Seen in the direction of flow of the heat transfer medium of the first cooling circuit, these are connected in such a way:

- that the heat transfer medium is directed from the distribution tank to the cylinders in a divided manner to carry out cylinder cooling,
- that, after passing the cylinders, the heat transfer medium is collected by the collection tank,
- that the heat transfer medium either passes from the collection tank by way of the thermostatic valve and by way of the cooler to the pump or that the heat transfer medium passes from the thermostatic valve directly to the pump, and
- that the heat transfer medium passes from the pump by way of the engine-oil cooler back to the distribution tank.

According to the invention, the second cooling circuit has in addition to the heat transfer medium the components of the electric drive, the heat exchanger, a pump and the fan, which, seen in the direction of flow of the heat transfer medium, are connected in such a way:

- that the heat transfer medium passes from the drive components to the pump,
- that the heat transfer medium passes on the one hand from the pump directly to the fan and on the other hand from the pump by way of the heat exchanger to the fan, and
- that the heat transfer medium passes from the fan back to the drive components, in order to take over the heat produced during the operation of the drive or the drive components.

In an advantageous refinement, a first connecting point is arranged, seen in the direction of flow of the heat transfer medium of the first cooling circuit, functionally ahead of the input of the pump, and so in every position of the thermostatic valve the first connecting point is in contact with the heat transfer medium and at least partially feeds it to the preheating circuit. A second connecting point is arranged between the engine-oil cooler and the distribution tank of the first cooling circuit, in order to feed the branched-off heat transfer medium of the first cooling circuit back to it.

In an advantageous refinement, the preheating circuit has a first series connection with the functionality of a preheating device. The first series connection is connected on the input side to the first connecting point and on the output side to the second connecting point, and so the branched-off heat transfer medium of the first cooling circuit passes from the first connecting point by way of the first series connection to the second connecting point.

The first series connection has, following one another in series, a pump, a heating element and a check valve. The heating element can be used to generate heat for intended operation, or starting up, of the internal combustion engine, which is fed to components of the internal combustion engine, in particular to the fan of the first cooling circuit, as and when required by way of the heat transfer medium.

In an advantageous refinement, the preheating circuit has a second series connection with the functionality of a preheating device. The first series connection is connected on the input side to the first connecting point and on the output side to the second connecting point, and so the branched-off heat transfer medium of the first cooling circuit passes from the first connecting point by way of the second series connection to the second connecting point.

The second series connection has, following one another in series, the electrical auxiliary heater and the heat exchanger of the preheating circuit.

The electrical auxiliary heater is used to generate heat for intended operation, or starting up, of the internal combustion engine or the electric drive.

The heat of the auxiliary heater optionally passes either by way of the heat transfer medium of the first cooling circuit to components of the internal combustion engine, in particular to the fan of the first cooling circuit (KK1), for heating. As an alternative to this, the heat of the auxiliary heater passes by way of the heat exchanger and by way of the heat transfer medium of the second cooling circuit to components of the electric drive, in particular to the fan (206) of the second cooling circuit (KK2), for heating.

In an advantageous refinement, the electric auxiliary heater is supplied with power from an additional secondary winding of the main transformer of the hybrid vehicle or from a backup electrical system on board the hybrid vehicle, and so it can be operated and switched on and off even when the hybrid vehicle is at a standstill.

In an advantageous refinement, to achieve the functionality of the preheating device, the second series connection has in addition to the electrical auxiliary heater and the heat exchanger a pump, a check valve and a switchable valve, which are connected in such a way that, seen in the direction of flow, the branched-off heat transfer medium passes from the first connecting point by way of the pump to the check valve, that, seen in the direction of flow, the branched-off heat transfer medium passes from the check valve by way of the heat exchanger to the electrical preheater and from there to the second connecting point.

The switchable valve is arranged parallel to the pump and the check valve, and so the latter can be bridged by way of the switchable valve. In a first switching state of the switchable valve, the heat transfer medium then passes from the first connecting point by way of the pump and by way of the downstream check valve to the heat exchanger. In a second switching state of the switchable valve, the heat transfer medium passes from the first connecting point directly to the heat exchanger, the check valve preventing the heat transfer medium from circulating through the preheating device by way of the control of the pump.

In an advantageous refinement, the hybrid vehicle is a hybrid rail vehicle in which the internal combustion engine is a diesel engine and in which the electric drive is an electric drive which is supplied with electrical power by way of a contact wire.

The present invention offers the advantage of increasing availability of the hybrid vehicle under extreme weather conditions in winter. A reliable changeover between the two drives is ensured even at very low temperatures.

The present invention makes it possible for components (for example fans) to be de-iced in a way that does not require any additional operating substances and is therefore emission-neutral.

The ecological fingerprint of the hybrid vehicle is further improved by the electrical auxiliary heater, because in contact-wire-based operation no fuel is used for the preheating.

With the electrical auxiliary heater, the present invention also offers the advantage that electrical auxiliary heating achieved with it can even take place at a standstill, for example when stopping at stations, this auxiliary heating operating with very little noise.

To sum up, the present invention provides an improved hybrid vehicle with respect to the changing of the drive at extreme temperatures, with greater availability and operational reliability of the system components, without at the same time adversely influencing the ecological fingerprint of the hybrid vehicle.

The invention is explained in more detail below on the basis of a drawing, in which:

BRIEF DESCRIPTION OF THE FIGURE

The sole figure of the drawing shows essential components of a hybrid vehicle 1, which are thermally coupled to one another according to the invention.

DETAILED DESCRIPTION OF THE INVENTION

The hybrid vehicle 1, as a rail vehicle, has two different drives, to be specific on the one hand an internal-combustion-engine-based drive or internal combustion engine 100 and a contact-wire-based electric drive 200.

In this case, the internal combustion engine 100 is designed for example as a diesel engine, which includes cylinders 101 for the combustion of (diesel) fuel. By way of example, sixteen cylinders 101 are shown here, arranged in two rows of eight cylinders 101 each.

The internal combustion engine 100 has a cooling circuit, which is referred to as hereinafter as the first cooling circuit KK1. This is intended to conduct heat generated by the internal combustion engine 100 by means of a heat transfer medium 102 to a cooler 106, which dissipates the heat sent to it to a surrounding area of the internal combustion engine 100 or the hybrid vehicle 1.

The first cooling circuit KK1 consequently has the cylinders 101, the heat transfer medium 102, a collection tank 103, a distribution tank 104, a thermostatic valve 105, the cooler 106, a pump 107 (motor pump) and an engine-oil cooler 108.

Water, which in a preferred refinement is mixed with an antifreeze, is used for example as the heat transfer medium 102.

The heat transfer medium 102 is provided by the collection tank 103 and/or by the distribution tank 104.

Seen in the direction of flow of the heat transfer medium 102, the distribution tank 104 is arranged upstream of the cylinders 101. It distributes the heat transfer medium 102 for carrying out cylinder cooling among the rows of cylinders 101.

Seen in the direction of flow of the heat transfer medium 102, the collection tank 103 is arranged downstream of the cylinders 101. It collects the divided heat transfer medium 102 from the rows of cylinders 101 again.

During the operation of the internal combustion engine 100, the heat transfer medium 102 takes over the heat thereby produced from the cylinders 101 and it passes from the collection tank 103 by way of the thermostatic valve 105 to the cooler 106.

The thermostatic valve 105 is designed to switch the cooler 106 to the first cooling circuit KK1 when a prescribed temperature Temp of the heat transfer medium 102 is reached and to switch the cooler 106 away from the first cooling circuit KK1 when the temperature of the heat transfer medium 102 goes below a prescribed temperature Temp.

Depending on the switching of the thermostatic valve 105, therefore, either the heat transfer medium 102 passes from the thermostatic valve 105 by way of the cooler 106 to the pump 107 or the cooler 106 is bypassed, and so the heat transfer medium 102 passes from the thermostatic valve 105 directly to the pump 107.

The cooler 106 is designed for example as a liquid-air heat exchanger with a downstream fan and dissipates the heat sent to it to the surrounding area of the internal combustion engine 100 or the hybrid vehicle 1.

The pump 107 is arranged downstream of the thermostatic valve 105 or the cooler 106 and is used to transport the heat transfer medium 102 within the first cooling circuit KK1. The pump 107 is designed for example as a centrifugal pump.

Consequently, the heat transfer medium 102, coming from the thermostatic valve 105 or from the cooler 106, passes by way of the pump 107 to the engine-oil cooler 108 and from there back to the distribution tank 104.

The engine-oil cooler 108 cools engine oil of the internal combustion engine 100, the engine oil as lubricating oil being arranged close to the cylinders within the internal combustion engine 100 and correspondingly being used close to the cylinders.

A necessary cooling of the engine oil is performed by the heat transfer medium 102, which additionally takes up the heat of the engine oil by way of the engine-oil cooler 108 and ultimately passes it to the cooler 106 for dissipation to the surrounding area.

The hybrid vehicle 1, as a rail vehicle, has in addition to the internal combustion engine 100 a contact-wire-based electric drive 200, the components 201 of which produce heat during operation.

The components 201 of the electric drive 200 are designed to transform electrical power from the contact wire for an electric drive of the hybrid vehicle 1, and consequently drive the latter electrically.

For example, these components 201 comprises a main transformer, a current converter, a backup transformer, etc.

The heat produced during the operation of the components 201 is sent by way of a cooling circuit, which is referred to hereinafter as the second cooling circuit KK2, by means of a heat transfer medium 202 from the components 201 of the electric drive 200 by way of a pump 207 to a cooler 206.

The cooler 206 is designed for example as a liquid-air heat exchanger with a downstream fan and dissipates the heat sent to it to the surrounding area of the hybrid vehicle 1 or to the surrounding area of the electric drive 200.

From the cooler 206, the heat transfer medium 202 then in the return flow goes back again to the components 201 of the electric drive 200. The heat transfer medium 202 is in this case in contact with the components 201 in such a way that the heat transfer medium 202 takes over the heat produced during the operation of the components 201.

Water, which in a preferred refinement is mixed with an antifreeze, is used for example as the heat transfer medium 202.

Seen in the direction of flow of the heat transfer medium 202, the pump 207 is arranged upstream of the cooler 206 and is used to transport the heat transfer medium 202 within the second cooling circuit KK2.

The pump 207 is designed for example as a centrifugal pump.

A heat exchanger 208, which is connected on the input side to the output of the pump 207 and is connected on the output side to a further input of the cooler 206, is additionally provided in the second cooling circuit KK2.

There is formed as a result in the second cooling circuit KK2, by way of the heat exchanger 208, a parallel branch, by way of which, as described below, heat can pass as and when required from the second cooling circuit KK2 to the first cooling circuit KK1 by way of a preheating circuit VWK.

Correspondingly, as described below, heat can pass as and when required from the first cooling circuit KK1 and/or from the preheating circuit VWK to the second cooling circuit KK2 by way of the heat exchanger 208 of the parallel branch.

The second cooling circuit KK2 consequently has the components 201 of the electric drive 200, the heat transfer medium 202, the pump 207, the cooler 206 and the heat exchanger 208.

At the same time, the heat exchanger 208 is a component part of the preheating circuit VWK, which is now described.

The preheating circuit VWK is coupled by way of two connecting points VP1, VP2 to the first cooling circuit KK1.

A first connecting point VP1 is arranged between the thermostatic valve 105 or the cooler 106 and ahead of the pump 107. Considered functionally and seen in the direction of flow of the heat transfer medium 102, it is arranged at the input of the pump 107, and so in every position of the thermostatic valve 105 it is in contact with the heat transfer medium 102 or is flowed through by it.

A second connecting point VP2 is arranged between the engine-oil cooler 108 and the distribution tank 104—to be more precise, seen in the direction of flow of the heat transfer medium 102, it is arranged between the output of the engine-oil cooler 108 and the input of the distribution tank 104.

The preheating circuit VWK has a first series connection SS1, which is connected on the input side to the first connecting point VP1 and on the output side to the second connecting point VP2. Consequently, this first series connection SS1 is arranged parallel to the series connection comprising the pump 107 and the engine-oil cooler 108 of the first cooling circuit KK1.

The first series connection SS1 achieves the functionality of a preheating device 301. The preheating device 301 includes for this a pump 307, a heating element 308 and a check valve 309.

The heat transfer medium 102 of the first cooling circuit KK1 is divided at the first connecting point VP1. The heat transfer medium 102 passes from the first connecting point VP1 by way of the preheating device 301 to the second connecting point VP2.

The divided heat transfer medium 102 is collected again at the second connecting point VP2.

In a preferred refinement, the heat transfer medium 102 passes from the first connecting point VP1 by way of the pump 307 of the preheating device 301 to the heating element 308 of the preheating device 301 and from there to the check valve 309 of the preheating device 301, in order thereafter to go to the second connecting point VP2.

The heating element 308 is designed for example as an electrical heating element or as a burner, in order to generate heat possibly required for the operation, or starting up, of the internal combustion engine 100. The heat formed by the heating element 308 is therefore fed to the internal combustion engine 100 as and when required by way of the heat transfer medium 102.

The pump 307 of the preheating device 301 is for example a centrifugal pump. It is intended to transport the heat transfer medium 102 of the first cooling circuit KK1 through the components of the first series connection SS1 or the preheating device 301.

The check valve 309 is open during the operation of the pump 307. This is ensured by way of the pressure formed by the pump 307 on the heat transfer medium 102. Correspondingly, the check valve 309 is closed when the pump 307 has been taken out of operation.

The functionality of the preheating device 301 is therefore activated and deactivated by way of the pump 307.

The preheating device 301 is deactivated when the preheating of the internal combustion engine 100 by means of the heating element 308 is not required or not desired.

That is the case for example when the heat transferred from the second cooling circuit KK2 by way of the preheating circuit VWK to the first cooling circuit KK1 is already sufficient to heat the internal combustion engine 100.

That is also the case for example when a burner operated with fuel is provided as the heating element 308 but the operation of which is not required or not desired for commercial reasons or on the basis of environmental aspects.

The preheating circuit VWK has a second series connection SS2, which is connected on the input side to the first connecting point VP1 and on the output side to the second connecting point VP2.

Consequently, this second series connection SS2 is likewise connected to the first cooling circuit KK1 and, depending on the control, is likewise flowed through by the first heat transfer medium 102.

The second series connection SS2 achieves the functionality of a preheating device 401. The preheating device 401 includes for this a pump 407, a check valve 409, the heat exchanger 208, which serves as a heating element of the second series connection SS2, an electrical auxiliary heater 406 and a switchable valve 405.

The pump 407 and the check valve 409 are arranged in series one after the other.

The switchable valve 405 is in this case connected parallel to the pump 407 and the check valve 409, and so, as described below, these two components can possibly be bridged by way of the switchable valve 405.

The heat transfer medium 102 consequently passes from the first connecting point VP1 by way of the preheating device 401 to the second connecting point VP2.

In a preferred refinement, in a first switching state of the switchable valve 405, the heat transfer medium 102 passes from the first connecting point VP1 by way of the pump 407 and by way of the downstream check valve 409 to the heat exchanger 208.

The first switching state is correspondingly referred to as the open switching state of the switchable valve 405.

In a second switching state of the switchable valve 405, the heat transfer medium 102 passes from the first connecting point VP1 directly to the heat exchanger 208, i.e. the pump 407 and the downstream check valve 409 are bridged.

The second switching state is correspondingly referred to as the closed switching state of the switchable valve 405.

From the heat exchanger 208, the heat transfer medium 102 passes by way of the electrical auxiliary heater 406 to the second connecting point VP2.

In a preferred refinement (not shown here any more specifically), the electrical auxiliary heater 406 is supplied from an additional secondary winding of the main transformer of the hybrid vehicle 1 or from a backup electrical system on board the hybrid vehicle 1, and so it can be operated and switched on and off even when the hybrid vehicle is at a standstill.

Heat is transferred to the heat transfer medium 102 of the preheating circuit VWK by the heat exchanger 208 or by the electrical auxiliary heater 406, which are optionally operated as heating elements of the second series connection SS2.

This heat optionally passes by way of the heat transfer medium 102 to the internal combustion engine 100.

As described below, heat may also optionally be transferred by the heat exchanger 208 from the first cooling circuit KK1 by way of the preheating circuit VWK to the second cooling circuit KK2, in order to heat up the components there.

Lastly, as described below, heat may also optionally, and without involving the components of the first cooling circuit, be transferred by the heat exchanger 208 from the preheating circuit VWK to the second cooling circuit KK2, in order to heat up the components there.

The pump 407 of the preheating device 401 is for example a centrifugal pump. It is intended to transport the heat transfer medium 102 of the first cooling circuit KK1 through the components of the second series connection SS2.

The check valve 409 is open during the operation of the pump 407. This is ensured by way of the pressure formed by the pump 407 on the heat transfer medium 102. Correspondingly, the check valve 409 is closed when the pump 407 has been taken out of operation.

The functionality of the preheating device 401 is therefore activated and deactivated by way of the pump 407.

There follows a description of the interacting operation of the individual components of the two cooling circuits KK1, KK2 and the preheating circuit VWK:

In a first case, a required heating up of the cooler 206 when there is a risk of icing in winter is presupposed in the event that in the hybrid vehicle 1 the internal combustion engine 100 is in operation and it is intended to switch over to contact-wire-based operation, i.e. to the electric drive 200.

As described, the cooler 206, as part of the second cooling circuit KK2, is intended to ensure the cooling of the components 201 of the electric drive 200.

In normal operation of the internal combustion engine 100, the first cooling circuit KK1 runs by way of the components pump 107, engine-oil cooler 108, distribution tank 104, cylinder 101, collection tank 103, thermostatic valve 105, cooler 106, and back to the pump 107.

The check valves 309 and 409 prevent the heat transfer medium 102 from circulating through the two preheating devices 301 and 401 by way of the control of the respective pumps 307 and 407. The switchable valve 405 is open, i.e. the check valve 409 and the pump 407 are part of the second series connection and are not bridged.

If a risk of icing of the fan 206 is detected for the intended drive switchover (for example by observations of the locomotive driver, by way of an evaluation of meteorological measured values or by measured values of sensors, etc.), then the switchable valve 405 is closed, i.e. the check valve 409 and the pump 407 are bridged and functionally deactivated.

This creates an additional circulation of the heat transfer medium 102 in the preheating circuit VWK, which specifically takes place through the heat exchanger 208.

Heat which has been formed by the internal combustion engine 100 then passes by way of the heat exchanger 208 into the second cooling circuit KK2, to be more precise its heat transfer medium 202. The heat transfer medium 202 transports this heat to the fan 206, in order to thaw it out or to reduce or prevent ice from forming there in winter.

In a second case, it is assumed that, in contact-wire-based operation by means of the electric drive 200, the waste heat of the components 201 is not sufficient to heat the internal combustion engine 100 properly for desired follow-up operation.

Preferably, required heat is then additionally provided by way of the electrical auxiliary heater 406, which is a component part of the second series connection SS2 of the preheating circuit VWK, and is transferred to the components of the internal combustion engine 100 by way of the heat transfer medium 102.

Advantageously, the preheating device 301, if it is fuel-operated, does not have to be activated here. This achieves a desirable state, with regard to emission values, in which neither an internal combustion engine nor a fuel-operated preheating device has to be activated in contact-wire-based operation.

When there is an assumed extreme risk of icing or risk of icing of the cooler 206, the electrical auxiliary heater 406 with the switchable valve 405 open can additionally assist the deicing of the cooler 206.

The invention claimed is:

1. A hybrid vehicle, comprising:
a changeable drive with an internal combustion engine, an electric drive, and first and second cooling circuits;
said internal combustion engine having said first cooling circuit with a heat transfer medium and with a cooler, said first cooling circuit being configured to take up heat from said internal combustion engine by way of the heat transfer medium and to conduct the heat transfer medium to said cooler for the heat to be dissipated to a surrounding area of said internal combustion engine;
said electric drive having said second cooling circuit with a heat transfer medium and with a cooler, said second cooling circuit being configured to conduct heat from components of said electric drive by way of the heat transfer medium to said cooler for the heat to be dissipated to a surrounding area of said electric drive;
a preheating circuit arranged between said first cooling circuit and said second cooling circuit;
said preheating circuit being connected to said first cooling circuit by way of two connecting points to circulate the heat transfer medium of said first cooling circuit through components of said preheating circuit;
said preheating circuit and said second cooling circuit having a heat coupler as a common component and being thermally coupled by said heat coupler to enable heat to be controllably exchanged between the heat transfer media of said two cooling circuits;
said preheating circuit having an electrical auxiliary heater connected in series with said heat coupler, and the heat transfer medium of said first cooling circuit also flowing through said electrical auxiliary heater and said heat coupler; and
said electrical auxiliary heater being configured and connected to enable heat generated by said electrical auxiliary heater to be selectively transferred when required into at least one of said first or second cooling circuits;
said second cooling circuit having the heat transfer medium, the components of said electric drive, said heat exchanger, a pump and a fan, which, relative to a direction of flow of the heat transfer medium, are connected such that:
the heat transfer medium passes from the components of said electric drive to said pump;
the heat transfer medium passes from said pump directly to said fan and also from said pump by way of said heat exchanger to said fan; and
the heat transfer medium passes from said fan back to the components of said electric drive, in order to take up the heat produced during an operation of the components of said electric drive;
wherein said first cooling circuit comprises cylinders of said internal combustion engine, the heat transfer medium, a collection tank, a distribution tank, an adjustable thermostatic valve, said cooler, a pump, and an engine-oil cooler, which, relative to the direction of flow of the heat transfer medium, are connected such that:
the heat transfer medium is directed from said distribution tank to said cylinders in a divided manner to carry out cylinder cooling;
after passing said cylinders, the heat transfer medium is collected by said collection tank;
the heat transfer medium either passes from said collection tank by way of said thermostatic valve and by way of said cooler to said pump or the heat transfer medium passes from said thermostatic valve directly to said pump; and
the heat transfer medium passes from said pump by way of said engine-oil cooler back to said distribution tank.

2. A hybrid vehicle, comprising:
a changeable drive with an internal combustion engine, an electric drive, and first and second cooling circuits;
said internal combustion engine having said first cooling circuit with a heat transfer medium and with a cooler, said first cooling circuit being configured to take up heat from said internal combustion engine by way of the heat transfer medium and to conduct the heat transfer medium to said cooler for the heat to be dissipated to a surrounding area of said internal combustion engine;

said electric drive having said second cooling circuit with a heat transfer medium and with a cooler, said second cooling circuit being configured to conduct heat from components of said electric drive by way of the heat transfer medium to said cooler for the heat to be dissipated to a surrounding area of said electric drive;
a preheating circuit arranged between said first cooling circuit and said second cooling circuit;
said preheating circuit being connected to said first cooling circuit by way of two connecting points to circulate the heat transfer medium of said first cooling circuit through components of said preheating circuit;
said preheating circuit and said second cooling circuit having a heat coupler as a common component and being thermally coupled by said heat coupler to enable heat to be controllably exchanged between the heat transfer media of said two cooling circuits;
said preheating circuit having an electrical auxiliary heater connected in series with said heat coupler, and the heat transfer medium of said first cooling circuit also flowing through said electrical auxiliary heater and said heat coupler; and
said electrical auxiliary heater being configured and connected to enable heat generated by said electrical auxiliary heater to be selectively transferred when required into at least one of said first or second cooling circuits;
said second cooling circuit having the heat transfer medium, the components of said electric drive, said heat exchanger, a pump and a fan, which, relative to a direction of flow of the heat transfer medium, are connected such that:
the heat transfer medium passes from the components of said electric drive to said pump;
the heat transfer medium passes from said pump directly to said fan and also from said pump by way of said heat exchanger to said fan; and
the heat transfer medium passes from said fan back to the components of said electric drive, in order to take up the heat produced during an operation of the components of said electric drive;
wherein:
a first connecting point is arranged, in the direction of flow of the heat transfer medium of said first cooling circuit, functionally ahead of an input of said pump, and, in every position of the thermostatic valve, said first connecting point is in contact with the heat transfer medium and at least partially feeds the heat transfer medium to said preheating circuit; and
a second connecting point is arranged between an engine-oil cooler and said distribution tank of said first cooling circuit, in order to feed branched-off heat transfer medium of said first cooling circuit back to said first cooling circuit.

3. The hybrid vehicle according to claim 2, wherein:
said preheating circuit has a first series connection with a functionality of a preheating device;
said first series connection has an input side connected to said first connecting point and an output side connected to said second connecting point, wherein a branched-off heat transfer medium of said first cooling circuit passes from said first connecting point by way of said first series connection to said second connecting point;
said first series connection includes, following one another in series, a pump, a heating element; and a check valve;
wherein said heating element is configured to generate heat for an intended operation, or a starting up, of said internal combustion engine, where the heat is fed to components of said internal combustion engine as and when required by way of the heat transfer medium.

4. The hybrid vehicle according to claim 3, wherein, in preparation for the operation, or the starting up, of said internal combustion engine heat is fed to said fan of said first cooling circuit.

5. The hybrid vehicle according to claim 3, wherein:
said preheating circuit has a second series connection with a functionality of a preheating device;
said second series connection has an input side connected to said first connecting point and an output side connected to said second connecting point, wherein a branched-off heat transfer medium of said first cooling circuit passes from said first connecting point by way of said second series connection to said second connecting point;
said second series connection includes, following one another in series, said electrical auxiliary heater and said heat exchanger of said preheating circuit;
said electrical auxiliary heater is configured to generate heat for an intended operation, or starting up, of said internal combustion engine or said electric drive;
wherein the heat of said auxiliary heater optionally passes either by way of the heat transfer medium of said first cooling circuit to components of said internal combustion engine for heating; or
wherein the heat of said auxiliary heater passes by way of said heat exchanger and by way of the heat transfer medium of said second cooling circuit to components of said electric drive.

6. The hybrid vehicle according to claim 5, wherein the heat of said auxiliary heater is either transferred to a fan of said internal combustion engine or to said fan of said second cooling circuit.

7. A hybrid vehicle, comprising:
a changeable drive with an internal combustion engine, an electric drive, and first and second cooling circuits;
said internal combustion engine having said first cooling circuit with a heat transfer medium and with a cooler, said first cooling circuit being configured to take up heat from said internal combustion engine by way of the heat transfer medium and to conduct the heat transfer medium to said cooler for the heat to be dissipated to a surrounding area of said internal combustion engine;
said electric drive having said second cooling circuit with a heat transfer medium and with a cooler, said second cooling circuit being configured to conduct heat from components of said electric drive by way of the heat transfer medium to said cooler for the heat to be dissipated to a surrounding area of said electric drive;
a preheating circuit arranged between said first cooling circuit and said second cooling circuit;
said preheating circuit being connected to said first cooling circuit by way of two connecting points to circulate the heat transfer medium of said first cooling circuit through components of said preheating circuit;
said preheating circuit and said second cooling circuit having a heat coupler as a common component and being thermally coupled by said heat coupler to enable heat to be controllably exchanged between the heat transfer media of said two cooling circuits;
said preheating circuit having an electrical auxiliary heater connected in series with said heat coupler, and the heat transfer medium of said first cooling circuit also flowing through said electrical auxiliary heater and said heat coupler; and said electrical auxiliary heater being configured and connected to enable heat generated by said electrical auxiliary heater to be selectively transferred when required into at least one of said first or second cooling circuits;

said second cooling circuit having the heat transfer medium, the components of said electric drive, said heat exchanger, a pump and a fan, which, relative to a direction of flow of the heat transfer medium, are connected such that:

the heat transfer medium passes from the components of said electric drive to said pump;

the heat transfer medium passes from said pump directly to said fan and also from said pump by way of said heat exchanger to said fan; and the heat transfer medium passes from said fan back to the components of said electric drive, in order to take up the heat produced during an operation of the components of said electric drive; and wherein said electric auxiliary heater is supplied with power from an additional secondary winding of a main transformer of the hybrid vehicle or from a backup electrical system on board of the hybrid vehicle, and said electric auxiliary heater is configured for operation and for selectively switching on and off even when the hybrid vehicle is at a standstill.

8. The hybrid vehicle according to claim 5, wherein:

to achieve the functionality of the preheating device, said second series connection includes, in addition to said electrical auxiliary heater and said heat exchanger, a pump, a check valve, and a switchable valve, which are connected in such a way:

that, seen in the direction of flow, the branched-off heat transfer medium passes from said first connecting point by way of said pump to said check valve;

that, seen in the direction of flow, the branched-off heat transfer medium passes from said check valve by way of said heat exchanger to said electrical preheater and from there to said second connecting point;

wherein said switchable valve is connected in parallel with said pump and said check valve, and so said check valve can be bridged by way of said switchable valve, wherein, in a first switching state of said switchable valve, the heat transfer medium passes from said first connecting point by way of the pump and by way of the downstream check valve to said heat exchanger, and, in a second switching state of said switchable valve, the heat transfer medium passes from said first connecting point directly to said heat exchanger, and wherein said check valve is connected to prevent the heat transfer medium from circulating through said preheating device by way of the control of said pump.

9. A hybrid rail vehicle, comprising:

a changeable drive with a diesel engine, an electric drive, a contact wire for supplying said electric drive with electrical power, and first and second cooling circuits;

said diesel engine having said first cooling circuit with a heat transfer medium and with a cooler, said first cooling circuit being configured to take up heat from said diesel engine by way of the heat transfer medium and to conduct the heat transfer medium to said cooler for the heat to be dissipated to a surrounding area of said diesel engine;

said electric drive having said second cooling circuit with a heat transfer medium and with a cooler, said second cooling circuit being configured to conduct heat from components of said electric drive by way of the heat transfer medium to said cooler for the heat to be dissipated to a surrounding area of said electric drive;

a preheating circuit arranged between said first cooling circuit and said second cooling circuit;

said preheating circuit being connected to said first cooling circuit by way of two connecting points to circulate the heat transfer medium of said first cooling circuit through components of said preheating circuit;

said preheating circuit and said second cooling circuit having a heat coupler as a common component and being thermally coupled by said heat coupler to enable heat to be controllably exchanged between the heat transfer media of said two cooling circuits;

said preheating circuit having an electrical auxiliary heater connected in series with said heat coupler, and the heat transfer medium of said first cooling circuit also flowing through said electrical auxiliary heater and said heat coupler; and said electrical auxiliary heater being configured and connected to enable heat generated by said electrical auxiliary heater to be selectively transferred when required into at least one of said first or second cooling circuits;

said second cooling circuit having the heat transfer medium, the components of said electric drive, said heat exchanger, a pump and a fan, which, relative to a direction of flow of the heat transfer medium, are connected such that:

the heat transfer medium passes from the components of said electric drive to said pump;

the heat transfer medium passes from said pump directly to said fan and also from said pump by way of said heat exchanger to said fan; and the heat transfer medium passes from said fan back to the components of said electric drive, in order to take up the heat produced during an operation of the components of said electric drive.

* * * * *